United States Patent
Friedly

(10) Patent No.: US 10,838,091 B2
(45) Date of Patent: Nov. 17, 2020

(54) SENSOR DEVICE HAVING AN IMPACT SURFACE

(71) Applicant: WESTERNGECO LLC, Houston, TX (US)

(72) Inventor: Seth Ian Friedly, Sandvika (NO)

(73) Assignee: WesternGeco L.L.C., Houston, TX (US)

( * ) Notice: Subject to any disclaimer, the term of this patent is extended or adjusted under 35 U.S.C. 154(b) by 796 days.

(21) Appl. No.: 15/328,877

(22) PCT Filed: Jul. 24, 2015

(86) PCT No.: PCT/US2015/041879
§ 371 (c)(1),
(2) Date: Jan. 24, 2017

(87) PCT Pub. No.: WO2016/014883
PCT Pub. Date: Jan. 28, 2016

(65) Prior Publication Data
US 2017/0212256 A1    Jul. 27, 2017

Related U.S. Application Data

(60) Provisional application No. 62/028,829, filed on Jul. 25, 2014.

(51) Int. Cl.
*G01V 1/18* (2006.01)
(52) U.S. Cl.
CPC ........................... *G01V 1/18* (2013.01)
(58) Field of Classification Search
None
See application file for complete search history.

(56) References Cited

U.S. PATENT DOCUMENTS

| 3,445,809 A | * | 5/1969 | McLoad | G01V 1/201 367/188 |
| 3,930,218 A | * | 12/1975 | Hall, Jr. | G01V 1/16 367/188 |

(Continued)

FOREIGN PATENT DOCUMENTS

WO    2012/138553 A2    10/2012

OTHER PUBLICATIONS

International Preliminary Report on Patentability for the equivalent PCT application PCT/US2015/041879 dated Feb. 9, 2017.

(Continued)

*Primary Examiner* — Hovhannes Baghdasaryan
*Assistant Examiner* — Jonathan D Armstrong
(74) *Attorney, Agent, or Firm* — Fletcher Yoder, P.C.

(57) ABSTRACT

A sensor device includes an elongated housing containing particle motion sensors spaced apart along a longitudinal axis of the elongated housing, where the elongated housing has a width. A second portion includes communication circuitry to communicate over a communication medium, the second portion coupled to the elongated housing and having a width that is greater than the width of the elongated housing. The second portion includes an impact surface that is above a top surface of the second portion, the impact surface to receive an impact force for deploying the sensor device into a ground surface. The second portion further includes a connector structure to mechanically connect the impact surface to the elongated housing.

20 Claims, 4 Drawing Sheets

(56) References Cited

U.S. PATENT DOCUMENTS

| | | | | |
|---|---|---|---|---|
| 3,993,859 A * | 11/1976 | McNeel | G01V 1/16 | 174/565 |
| 4,122,433 A * | 10/1978 | McNeel | G01V 1/181 | 367/188 |
| 4,398,276 A * | 8/1983 | Kruppenbach | G01V 1/20 | 367/177 |
| 4,455,631 A * | 6/1984 | San Giovanni | G01V 1/16 | 340/565 |
| 4,534,222 A * | 8/1985 | Finch | G01H 9/004 | 250/227.14 |
| 4,599,713 A * | 7/1986 | Rudaz | G01V 1/16 | 181/122 |
| 4,809,245 A * | 2/1989 | Woodall | G01V 1/16 | 367/178 |
| 4,811,311 A * | 3/1989 | Woodall, Jr. | G01V 1/181 | 181/122 |
| 4,813,029 A * | 3/1989 | Erich, Jr. | G01V 1/16 | 181/401 |
| 4,838,379 A * | 6/1989 | Maxwell | G01V 1/16 | 175/19 |
| 4,893,290 A * | 1/1990 | McNeel | G01V 1/16 | 181/102 |
| 5,007,031 A * | 4/1991 | Erich, Jr. | G01V 1/16 | 175/19 |
| 5,010,531 A * | 4/1991 | McNeel | G01V 1/184 | 174/74 A |
| 5,014,813 A * | 5/1991 | Fussell | G01V 1/181 | 181/122 |
| 5,046,056 A * | 9/1991 | Sallas | G01V 1/181 | 367/166 |
| 5,109,362 A * | 4/1992 | Berni | G01H 9/00 | 356/487 |
| 5,124,956 A * | 6/1992 | Rice | G01V 1/16 | 181/122 |
| 5,126,980 A * | 6/1992 | Sallas | G01P 15/09 | 310/800 |
| 5,130,954 A * | 7/1992 | Fussell | G01V 1/16 | 181/122 |
| 5,142,499 A * | 8/1992 | Fletcher | G01V 1/20 | 181/401 |
| 5,187,332 A * | 2/1993 | El-Rabaa | G01V 1/52 | 181/122 |
| 5,866,827 A * | 2/1999 | Stewart | G01V 1/16 | 73/652 |
| 5,903,153 A * | 5/1999 | Clarke | G01V 3/082 | 324/323 |
| 6,301,195 B1 * | 10/2001 | Faber | G01V 1/181 | 367/188 |
| 6,307,808 B1 * | 10/2001 | Schmidt | G01V 1/166 | 367/178 |
| 6,353,577 B1 * | 3/2002 | Orban | G01V 1/16 | 367/178 |
| 6,814,160 B1 * | 11/2004 | Scott | G01V 1/16 | 175/19 |
| 7,284,431 B1 * | 10/2007 | Barger | G01H 11/02 | 367/181 |
| 7,684,284 B1 * | 3/2010 | Al-Jadani | G01V 1/185 | 367/178 |
| 8,499,679 B1 * | 8/2013 | Crowell | F41A 23/36 | 181/114 |
| 9,594,174 B2 * | 3/2017 | Goujon | G01V 1/162 | |
| 2001/0030907 A1 * | 10/2001 | Bachrach | G01V 1/20 | 367/25 |
| 2005/0027453 A1 * | 2/2005 | Fort | G01V 1/003 | 702/14 |
| 2007/0235250 A1 * | 10/2007 | Krumhansl | G01V 1/147 | 181/121 |
| 2008/0137484 A1 * | 6/2008 | Scott | G01V 1/184 | 367/188 |
| 2010/0020647 A1 * | 1/2010 | Hache | G01V 1/16 | 367/188 |
| 2010/0074055 A1 * | 3/2010 | Nemeth | G01V 1/223 | 367/77 |
| 2010/0302909 A1 | 12/2010 | Muyzert et al. | | |
| 2011/0082647 A1 | 4/2011 | Edme et al. | | |
| 2012/0134752 A1 * | 5/2012 | Eisenhower | H02G 1/10 | 405/166 |
| 2013/0021875 A1 * | 1/2013 | Eick | G01V 1/003 | 367/56 |
| 2013/0272091 A1 * | 10/2013 | Yilmaz | G01V 1/186 | 367/77 |
| 2013/0308426 A1 | 11/2013 | Scarlatti et al. | | |
| 2013/0315036 A1 | 11/2013 | Paulson et al. | | |
| 2014/0111207 A1 * | 4/2014 | Kraemer | G01V 1/52 | 324/324 |
| 2014/0126329 A1 * | 5/2014 | Guyton | G01V 1/18 | 367/76 |
| 2014/0219053 A1 * | 8/2014 | Goujon | G01V 1/30 | 367/38 |
| 2014/0293741 A1 * | 10/2014 | Halliday | G01V 1/145 | 367/14 |
| 2015/0043310 A1 * | 2/2015 | Maas | G01V 1/226 | 367/188 |
| 2015/0078127 A1 * | 3/2015 | Bertrand | G01V 1/22 | 367/76 |
| 2016/0025875 A1 * | 1/2016 | Friedly | G01V 13/00 | 367/76 |
| 2016/0146643 A1 * | 5/2016 | Martin | G01S 19/35 | 473/223 |
| 2016/0334523 A1 * | 11/2016 | Edme | G01V 1/20 | |
| 2017/0131416 A1 * | 5/2017 | Mantel | G01V 1/003 | |
| 2017/0212259 A1 * | 7/2017 | Degner | G01V 1/166 | |
| 2017/0225889 A1 * | 8/2017 | Edme | G01V 1/16 | |
| 2017/0357017 A1 * | 12/2017 | Grimsdale | G01V 1/168 | |
| 2019/0120983 A1 * | 4/2019 | Amar | G01V 1/166 | |
| 2019/0250290 A1 * | 8/2019 | Oeverland | G01V 1/181 | |
| 2019/0265083 A1 * | 8/2019 | Fernihough | G01V 1/226 | |

OTHER PUBLICATIONS

International Search Report and Written Opinion issued in the related PCT application PCT/US2015/041879, dated Feb. 25, 2016 (17 pages).

* cited by examiner

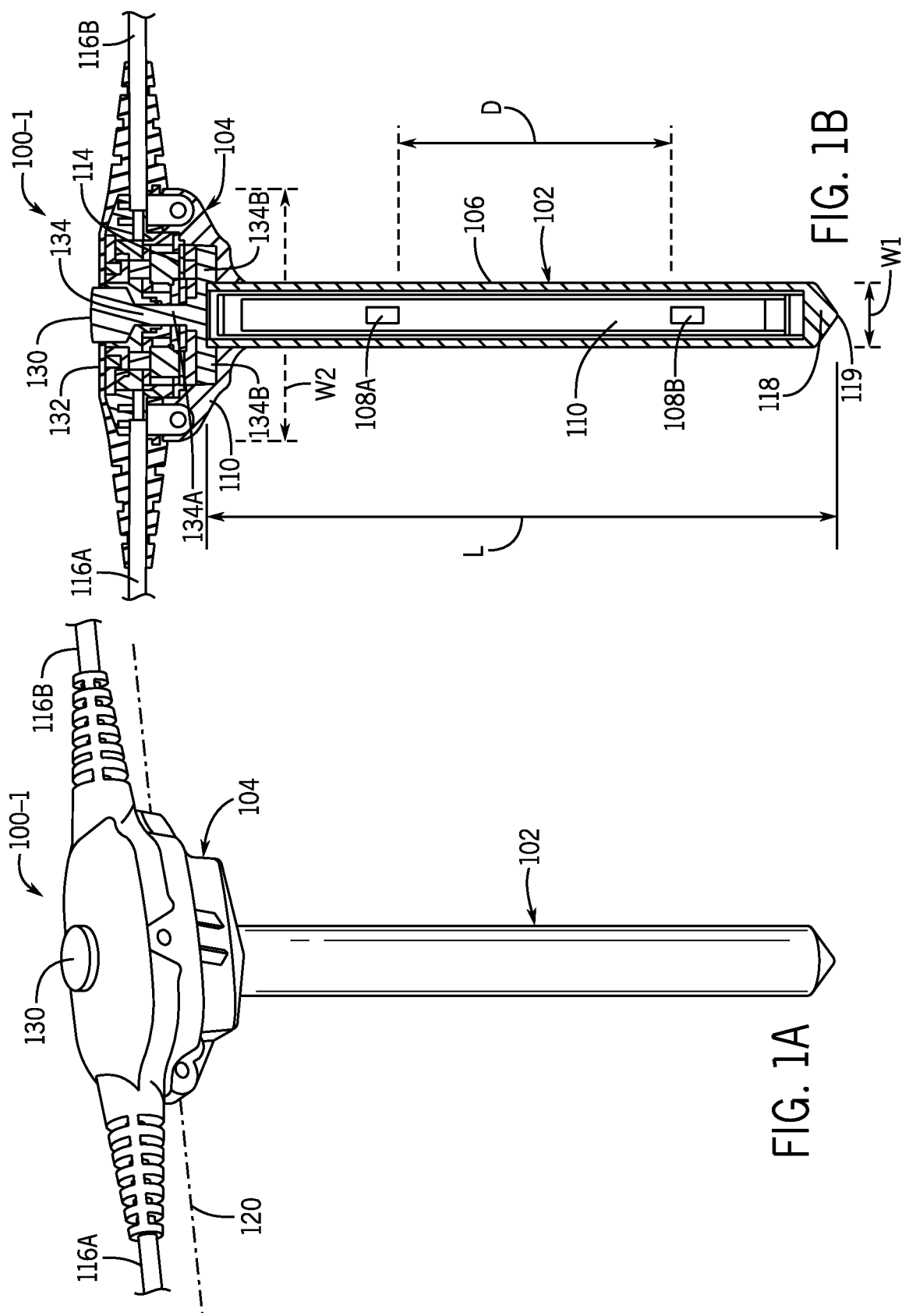

SENSOR DEVICE HAVING AN IMPACT SURFACE

CROSS-REFERENCE TO RELATED APPLICATION

This application claims the benefit under 35 U.S.C. § 119(e) of U.S. Provisional Application Ser. No. 62/028,829, entitled "SENSOR DEVICE HAVING AN IMPACT SURFACE," filed Jul. 25, 2014, which is hereby incorporated by reference.

BACKGROUND

Seismic surveying is used for identifying subterranean elements of interest, such as hydrocarbon reservoirs, freshwater aquifers, gas injection zones, and so forth. In seismic surveying, seismic sources are activated to generate seismic waves directed into a subterranean structure.

The seismic waves generated by a seismic source travel into the subterranean structure, with a portion of the seismic waves reflected back to the surface for receipt by seismic sensors (e.g. geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor.

SUMMARY

In general, according to some implementations, a sensor device includes an elongated housing containing particle motion sensors spaced apart along a longitudinal axis of the elongated housing, where the elongated housing has a width. A second portion includes communication circuitry to communicate over a communication medium, the second portion coupled to the elongated housing and having a width that is greater than the width of the elongated housing. The second portion includes an impact surface that is above a top surface of the second portion, the impact surface to receive an impact force for deploying the sensor device into a ground surface. The second portion further includes a connector structure to mechanically connect the impact surface to the elongated housing.

Other or alternative features will become apparent from the following description, from the claims, and from the drawings.

BRIEF DESCRIPTION OF THE DRAWINGS

Some embodiments are described with respect to the following figures.

FIGS. 1A-1B and 3 depict sensor devices including corresponding load transfer mechanisms according to various implementations.

DETAILED DESCRIPTION

Figure 2C:
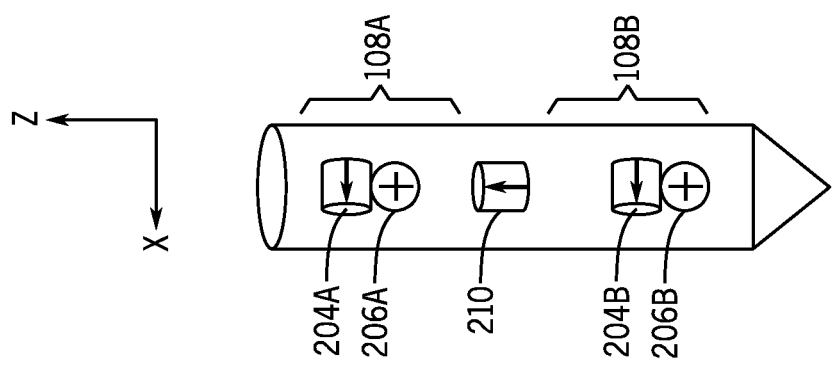
FIGS. 2A-2C are schematic diagrams of sensor components within a sensor device according to some implementations.

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors, or any other type of sensors that measure translational motion of the surface in one or more directions. In the ensuing discussion, a seismic sensor that measures translational motion is referred to as a particle motion sensor. A particle motion sensor can refer to any of the sensors listed above.

An arrangement of particle motion sensors can be provided at (or proximate) a ground surface or earth surface (land surface or bottom surface of a body of water, such as a seafloor) to measure seismic waves reflected from a subterranean structure, in response to seismic waves (or impulses) produced by one or more seismic sources and propagated into an earth subsurface. A particle motion sensor provided at a ground surface can refer to a particle motion sensor that is placed in contact with the ground surface, partially buried in the ground surface, or completely buried in the ground surface up to a predetermined depth (e.g. up to a depth of less than 5 meters). A particle motion sensor at (or proximate) the earth surface can record the vectorial part of an elastic wavefield just below the free surface (i.e. ground surface).

In addition to measuring translational data, it may be useful to obtain rotation data when performing survey data acquisition for various purposes. For example, rotation data can be combined with translational data measured by particle motion sensors to eliminate or attenuate noise from the measured translational data. Examples of noise include ground-roll noise or another type of noise (such as ambient noise) that can travel along the earth's surface. Ground-roll noise can be produced by a seismic source or other source, such as cars, engines, pumps, and natural phenomena such as wind and ocean waves. The ground-roll noise travels generally horizontally along an earth surface towards seismic receivers. The horizontally traveling seismic waves, such as Rayleigh waves or Love waves, are undesirable components that can contaminate seismic survey data.

Although reference is made to using rotation data to attenuate noise, it is noted that rotation data can be used for other purposes, whether in the context of a land-based survey acquisition or marine-based survey acquisition in which a seabed cable or other arrangement of seismic sensors is placed on the seafloor. For example, rotation data and translational data can be used in performing various seismic data processing algorithms, including, among others, wavefield interpolation, wavefield extrapolation, wavefield reconstruction, wavefield regularization, P- and S-wave separation, apparent velocity estimation, near-surface characterization, seismic sensor calibration, and seismic imaging.

Wavefield interpolation refers to estimating (interpolating) wavefields at locations where seismic sensors are not provided. P- and S-wave separation refers to separating compressional (P) waves from shear (S) waves in measured seismic survey data. Apparent velocity estimation refers to estimating a characteristic of the seismic wavefield known as ray parameter or horizontal slowness, from which seismic wave velocities at various points in a subterranean structure can be retrieved. Near-surface characterization refers to estimating the shallow earth elastic properties. Seismic sensor calibration refers to calibrating a seismic sensor to compensate for any non-ideal characteristic of the seismic sensor.

Rotation data refers to a rate of rotation (or change in rotation over time) about a specific axis, such as about the x axis (which can also be referred to as a horizontal inline axis) and/or about the y axis (which can also be referred to as a horizontal crossline axis). In accordance with some implementations, rotation data can be derived based on translational data measured by particle motion sensors. In this way, a separate rotational sensor would not have to be provided in survey equipment for the purpose of measuring rotation data.

FIG. 1A is a perspective side view of an example seismic sensor device 100-1 according to some implementations. FIG. 1B is a sectional view of the sensor device 100-1. The sensor device 100-1 includes a stick-shaped portion 102 and an enlarged portion 104. As shown in the sectional view of FIG. 1B, the stick-shaped portion 102 has an elongated housing 106 having a length L along a longitudinal axis of the elongated housing 106. The elongated housing 106 also has a width W1 along a dimension of the elongated housing 106 that is perpendicular to the longitudinal axis. The length L is greater than the width W1 of the elongated housing 106. In some implementations, the length L can be 15 centimeters (cm) or greater, and the width W1 can be 2 cm or greater. In further implementations, the length L and width W1 of the elongated housing 106 can be designed such that the ratio of L to W is greater than or equal to 7.

As further depicted in FIG. 1B, sensor components 108A and 108B are contained within a chamber 110 inside the elongated housing 106 of the stick-shaped portion 102. Although just two sensor components are depicted in the example of FIG. 1B, note that in further examples, more than two sensor components can be contained inside the chamber 110 of a single housing (i.e. the elongated housing 106). The elongated shape of the elongated housing 106 of the stick-shaped portion 102 of the sensor device 100-1 allows the sensor components 108A and 108B to be spaced apart along the longitudinal axis of the elongated housing 106, by a distance D. In some examples, the sensor components 108A and 108B can be arranged to be spaced apart by the distance D without providing particle motion sensors spaced apart in a direction perpendicular to the longitudinal axis. In some implementations, the sensor components 108A and 108B are co-axial along the longitudinal axis of the elongated housing 106.

The elongated housing 106 can be in the form of a hollow tube, a stick, or other elongated structure. In some examples, the elongated housing 106 can be cylindrical in shape. The cross section of the elongated housing 106 can be circular or non-circular in shape. Examples of non-circular cross-sections of the elongated housing 106 include a hexagon, a rectangle, or any other polygon.

The elongated housing 106 can be made out of a material, such as plastic (e.g. conductive plastic or non-conductive plastic), metal, a metal foam, a combination of plastic and metal (e.g. metal deposited on plastic or vice versa), and so forth. According to an example embodiment, the housing 106 may be configured to not resonate within a frequency bandwidth of interest for target signals that are to be measured. In some examples, the bandwidth of interest can be in the range between 1 to 250 Hertz (Hz). In other examples, the elongated housing 106 may exhibit resonance; in such examples, the resonance can be removed by processing, or the resonance can be compensated for by processing.

By arranging the sensor components 108A and 108B in the elongated housing 106 as shown in FIG. 1B, the sensor components 108A and 108B are spaced apart along just the longitudinal axis. In other words, in some implementations, the sensor device 100-1 does not include sensor components that are spaced apart in any other direction (other than a direction parallel to the longitudinal axis).

However, in further implementations, there can be sensor components that are spaced apart along the dimension of the width W1, for example.

FIG. 1A shows a portion of the sensor device 100-1 being below a ground surface 120, and a portion of the sensor device 100-1 being above the ground surface 120. According to some examples, an arrangement can include the sensor component 108B below the ground surface 120 and the sensor component 108A above the ground surface 120. A sensor component can also be positioned at or proximate the ground surface 120. According to an example arrangement, a majority of the sensor device 100-1 can be below the ground surface 120. According to another example arrangement, a majority of the sensor device 100-1 can be above the ground surface 120. Another example arrangement can have approximately half the sensor device 100-1 above and half the sensor device 100-1 below the ground surface 120. Another example arrangement can have the entirety of the sensor device 100-1 below the ground surface 120.

The enlarged portion 104 of the sensor device 100 includes an outer housing 110 that defines an inner chamber in which various circuitry can be included. The outer housing 110 of the enlarged portion 104 can be formed of a material selected from the possible materials listed above for the elongated housing 106. A width W2 of the enlarged portion 104 (as measured along a dimension of the enlarged portion that is parallel to the dimension of the width W1 of the stick-shaped portion 102) is greater than the width W1. The larger size of the enlarged portion 104 allows greater space to accommodate circuitry. In some implementations, the width W2 is greater than the width W1 by a factor of 2 or greater, or 3 or greater.

The circuitry contained in the enlarged portion 104 can include a communication interface circuit 114 (FIG. 1B), which is connected to communication media 116A and 116B (e.g. electrical cables, fiber optic cables, etc.). In other examples, the communication interface circuit 114 can communicate wirelessly over a wireless medium over which data can be communicated. The communication interface circuit 114 is electrically connected to the sensor components 108A and 108B. Data acquired by the sensor components 108A and 108B are transferred to the communication interface circuit 114, which in turn transmits the acquired data over the communication media 116A, 116B for communication to a remote station, which can be a recording station, a computer, and so forth.

According to other examples, a memory can be provided and incorporated in the enlarged portion 104. The memory can also be separate from the sensor device 100-1 and connected by wire, or short range wireless technology such as Wi-Fi or Bluetooth.

Also, the enlarged portion 104 can include control circuitry to control the sensor components 108A, 108B. Additionally, an analog-to-digital converter and other components may be included, such as in the communication interface circuit 114, to convert signals measured by the sensor components 108A, 108B into digital form. The components in the sensor device 100-1 may be powered by a battery, a solar panel, or through a wired or wireless connection.

The bottom portion of the sensor device 100-1 may include a spike 118 for driving the sensor device 100-1 into the ground surface 120. The spike 118 has a generally sharp tip 119 that allows for easier insertion of the sensor device 100-1 into the ground surface 120 to form a connection between the earth and the sensor device 100-1. A user or machine can push the spike 118 into the ground surface 120 to cause at least a portion of the sensor device 100-1 to be buried in the earth beneath the ground surface 120. For example, the sensor device 100-1 can be driven into the ground surface using a hammer, either by a user or in an automated manner by a machine. In different examples, the sensor device 100-1 can be screwed into the ground by a wrench or planted in a prepared borehole with reduced disturbance of the surrounding earth. As another example, a borehole may be dug and the sensor device 100-1 may be placed therein. The borehole may be refilled after positioning the sensor device 100.

Due to the longer length of the sensor device 100-1, a relatively deep hole may have to be dug to deploy the sensor device 100-1 in the hole, for arrangements in which the sensor device 100-1 is deployed vertically into the ground surface. To achieve good coupling, most of the sensor device 100-1 may have to be buried. Rather than dig a deep oversized hole to bury the sensor device 100-1, a drill can be used to create a hole in which to insert the sensor device 100-1.

With certain ground conditions, the hole may collapse a bit or the drilled hole may be undersized to achieve good coupling. In these cases, the sensor device 100-1 may have to be pushed with force into the prepared hole. Application of force to the top of the sensor device 100-1 may cause damage to the electronic circuitry in the upper portion of the sensor device 100-1, and more particularly to the electronic circuitry in the enlarged portion 104.

To protect the electronic circuitry in the upper portion of the sensor device 100-1, a load transfer mechanism according to some implementations of the present disclosure may be provided in the sensor device 100-1. This load transfer mechanism can improve the reliability of the sensor device 100-1 by removing some load from the electronic circuitry and connectors, with the load directed to the elongated housing 106 without any intermediate load transferring components. The load transfer mechanism can also facilitate the use of custom deployment equipment which can interface to the load transfer mechanism.

In some implementations, the load transfer mechanism in the sensor device 100-1 includes an impact button 130 to which a force can be applied for pushing the sensor device 100-1 into a ground surface. As shown in FIG. 1B, a portion of the impact button 130 extends above the top part 132 of the enlarged portion 104. This protruding portion of the impact button 130 allows for force to be applied to the impact button 130 without also impacting the top part 132 of the enlarged portion 104.

The impact button 130 is attached to a generally T-shaped connector structure 134, which mechanically connects the impact button 130 to the elongated housing 106 of the stick-shaped portion 102. Force applied on the impact button 130 is transferred by the connector structure 134 to the elongated housing 106 of the stick-shaped portion 102, to reduce force imparted on the electronic circuitry and other components contained in the enlarged portion 104.

The T-shaped connector structure 134 includes a vertical segment 134A and a horizontal segment 134B that is integrally attached to the vertical segment 134A. In other examples, the vertical segment 134A and horizontal segment 134B can be separate pieces that are attached together. Force applied on the upper surface of the impact button 130 is transferred down the vertical segment 134A and in turn to the horizontal segment 134B.

The horizontal segment 134B is in contact with the elongated housing 106, such that force applied on the horizontal segment 134B is transferred to the elongated housing 106. Thus, a majority of the force applied on the impact button 130 is transferred to the elongated housing 106, rather than to the other components inside the enlarged portion 104. The force transferred to the elongated housing 106 travels along the elongated housing 106 downwardly to the spike 118 attached to the bottom of the elongated housing 306.

More generally, the load transfer mechanism of a sensor device can include an impact surface (e.g. upper surface of the impact button 130) to which a force is applied for deploying the sensor device into a hole. The load transfer mechanism further includes a connector structure that connects the impact surface to a housing of the sensor device away from the portion of the sensor device that includes sensitive components, such as electronic circuitry and connectors.

The load transfer mechanism will transmit deployment loading to the housing and prevent the load from being applied to sensitive components. The load transfer mechanism can be utilized on a sensor with one or more electrical connectors.

The size of the load transfer mechanism can be designed to provide a large surface area while still allowing the cable sections (e.g. 116A and 116B in FIGS. 1A and 1B) to be inserted and connected. The tolerance between components can be designed such that any load applied to the top of the load transfer mechanism is transmitted directly into the sensor housing. No loading occurs through the electronic circuitry or cable connectors.

The cable connector can contain a pin hole to fix the cable connector into the sensor device housing to hold the final assembly of the sensor device together. The housing has sufficient length on the two sides adjacent to the cable sections to receive the pin that passes through the cable sections.

In some examples, the sensor components 108A and 108B are sensor chips. A sensor chip refers to an integrated circuit device that includes a substrate (e.g. semiconductor substrate) on which particle motion sensors can be provided. For example, the particle motion sensors that can be provided in the sensor chip 108A or 108B can include MEMS particle motion sensors, such as MEMS accelerometers. A MEMS particle motion sensor can include a micro element (e.g. a micro cantilever) that is moveable in response to particle motion, where the movement of the micro element can be detected by a sensing element. In other examples, the sensor components 108A and 108B can include other types of particle motion sensors. It should be noted that the MEMS particle motion sensors do not have to be on the "chip," but that is an option. An example of a MEMS and electronics configuration is described in U.S. Patent Application Publication No. 2013/0315036.

In some implementations, the particle motion sensors that are provided in the sensor component 108A or 108B can measure translational data in multiple directions, such as the x, y and z directions. Examples of such arrangements are shown in FIGS. 2A and 2B, where the sensor component 108A or 108B includes a respective z sensor 202A or 202B (for measuring translational data along the z axis), a respective x sensor 204A or 204B (for measuring translational data along the x axis), and a respective y sensor 206A or 206B (for measuring translational data along the y axis).

Figure 2B:
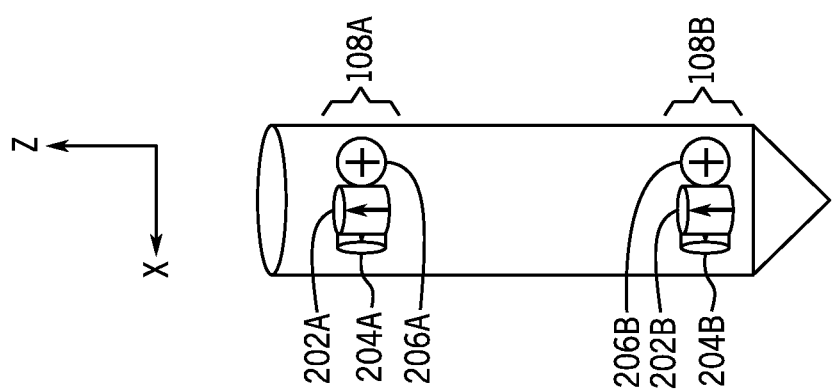
Figure 2A:
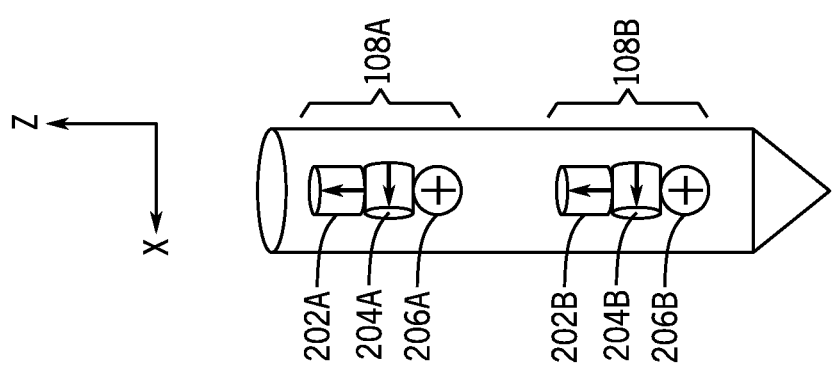

In further examples, such as shown in FIG. 2C, the sensor component 108A or 108B can include just a respective x sensor 204A or 204B and a respective y sensor 206A or 206B. In the arrangement of FIG. 2C, a separate z sensor 210 can be provided for measuring translational data along the z direction. The z sensor 210 can be positioned in the middle between sensor components 108A and 108B. In other examples, the z sensor 210 can be positioned elsewhere, such as in either 108A or 108B. In some implementations, a pair of sensors (e.g. 204A and 204B, or 206A and 206B, or 202A and 202B) can be hardwired together to provide the sum and the difference as outputs. The sum can help reduce the non-correlated noise (between the elements of a pair) and the difference provides a gradient.

In other implementations, the sensor component 108A can include particle motion sensors to measure in just the x and y axes, while the sensor component 108B can include particle motion sensors to measure the x, y and z axes, and vice versa Note that the particle motion sensors in a given component (e.g. 108A) within the same sensor device 100 do not have to be orientated in the same direction as the other sensor component (e.g. 108B). If the relative angle between the sensor components 108A and 108B is known, then the measured data by the pair of particle motion sensors can be corrected using vector rotation.

Figure 3:
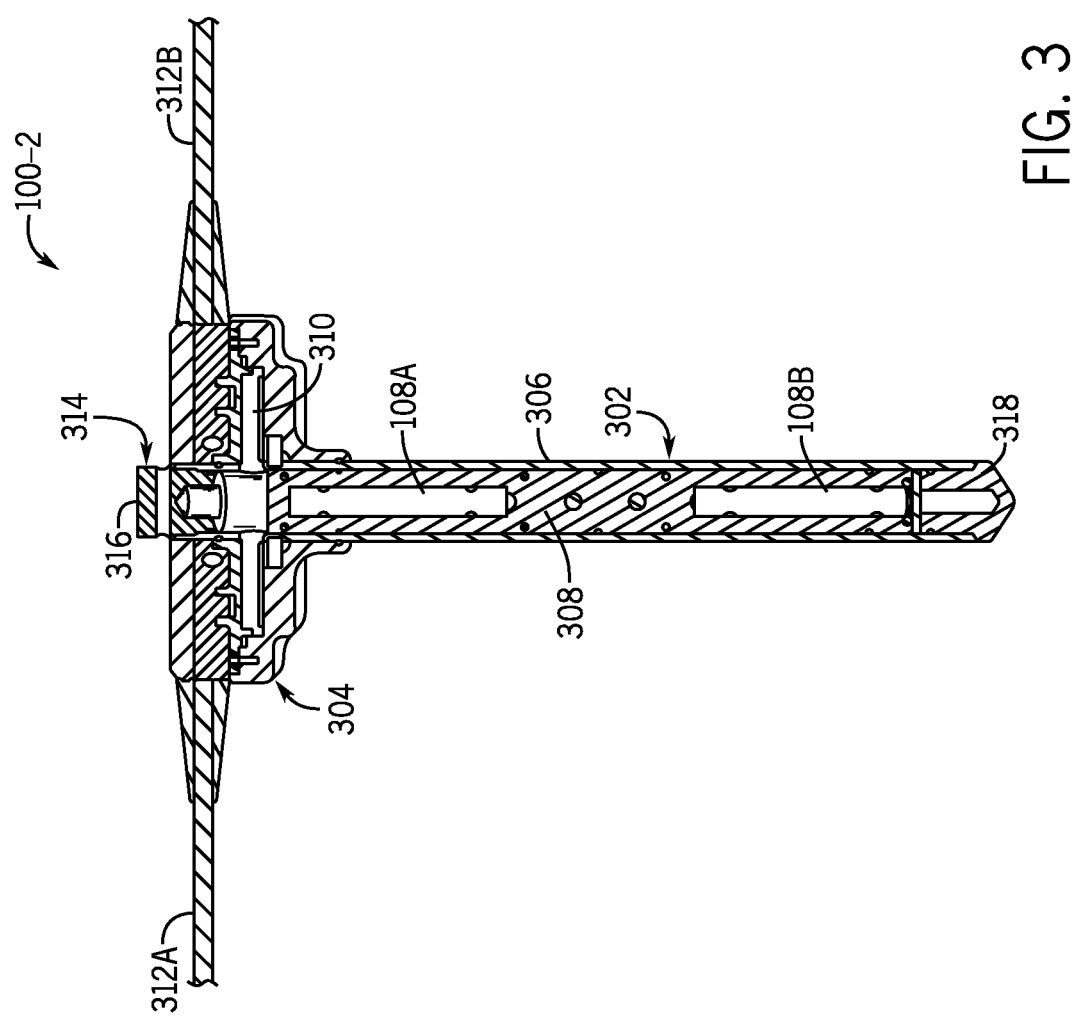

FIG. 3 is a sectional view of a sensor device 100-2 according to further implementations. The sensor device 100-2 also includes a load transfer mechanism according to some implementations of the present disclosure. The sensor device 100-2 includes a stick-shaped portion 302 and an enlarged portion 304 that is attached to an elongated housing 306 of the stick-shaped portion 302.

Sensor components 108A and 108B are included inside the elongated housing 306. The sensor components 108A and 108B are arranged on a circuit board 308 that is mounted in an inner chamber of the elongated housing 306.

The enlarged portion 304 includes an outer housing that defines an inner chamber containing electronic circuitry 310 and connectors to connect to cables 312A and 312B (e.g. electrical cables or optical cables). The electronic circuitry 310 is electrically connected to the circuit board 308, to allow the electronic circuitry 310 to receive signals (containing measurement data) from the sensor components 108A and 108B.

The load transfer mechanism of the sensor device 100-2 includes an impact button 314, which has an upper impact surface 316. The impact button 314 is attached by a connector structure to an upper section of the elongated housing 306. In FIG. 3, the elongated housing 306 extends into the enlarged portion 304 to allow mechanical connection to the impact button 314. A force applied on the impact button 314 is transferred to the upper portion of the elongated housing 306, and in turn to the lower portion of the elongated housing 306. This force travels along the elongated housing downwardly to a spike attached to the bottom of the elongated housing 306.

Figure 4:
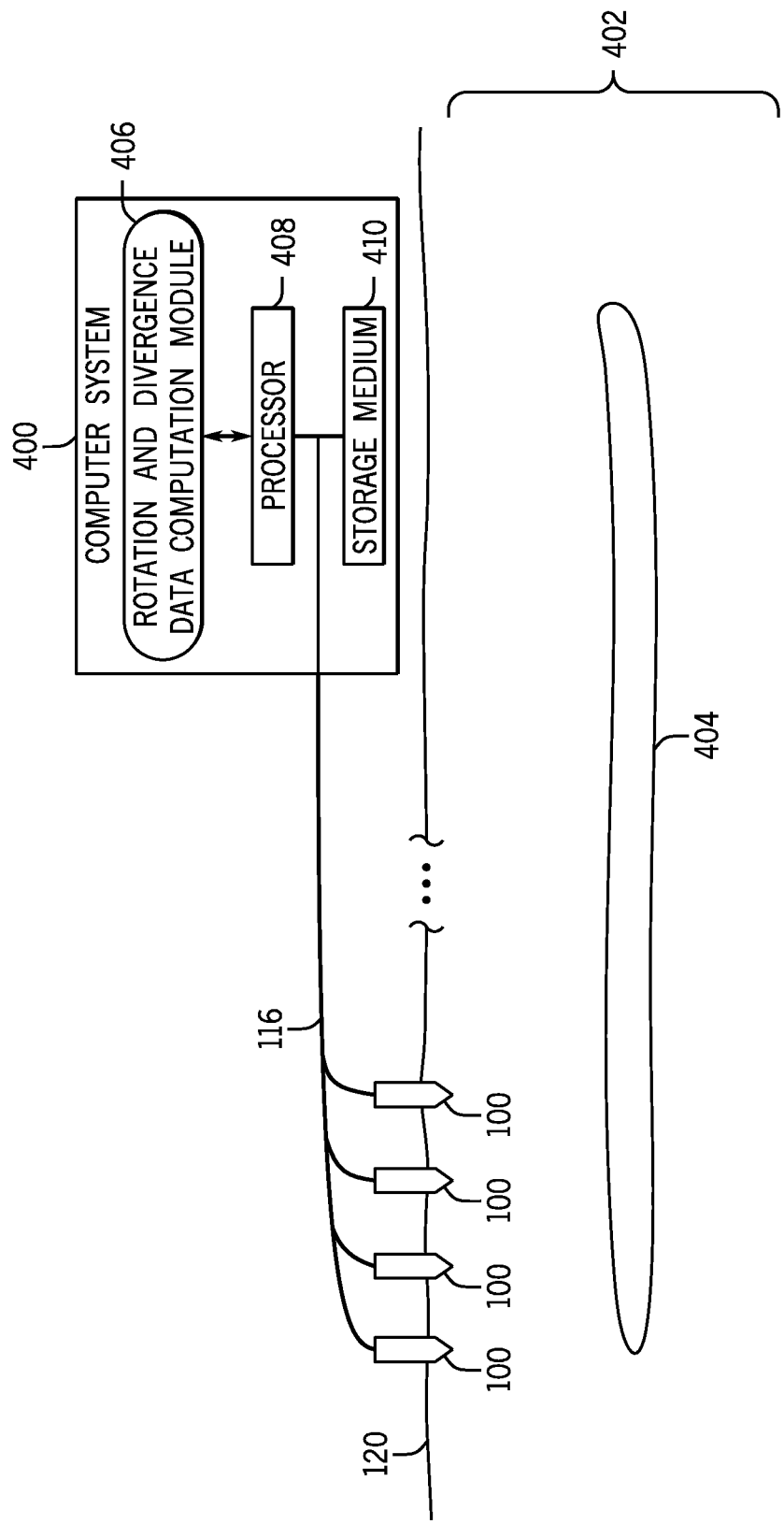
FIG. 4 is a schematic diagram of an example survey arrangement including sensor devices according to some implementations.

FIG. 4 is a schematic diagram of a land-based survey arrangement (including a seismic sensor system) that includes sensor devices 100 (any of sensor devices 100-1 and 100-2 discussed above) according to some implementations. In different examples, the sensor devices 100 can be deployed in a marine survey arrangement.

Measurements acquired by the sensor devices 100 are transmitted to a computer system 400 over a communication medium 116 (e.g. 116A or 116B or both in FIG. 1A, or 312A or 312B or both in FIG. 3), where the measurements are recorded (stored in a storage medium or storage media 410). The measurements are made by the sensor devices 100 in response to seismic waves produced by one or more seismic sources (not shown). The seismic waves are propagated into a subterranean structure 402, and reflected from a subterranean element 404 of interest. The reflected waves are detected by the sensor devices 100.

The computer system 400 includes a rotation and divergence data computation module 406, which can be implemented with machine-readable instructions that are executable on one or more processors 408. The rotation and divergence data computation module 406 can compute rotation data and divergence data.

The processor(s) 408 can be coupled to the storage medium (or storage media) 1310, which can store data, such as translational data received from the sensor devices 100.

The storage medium (or storage media) 410 can be implemented as one or more non-transitory computer-readable or machine-readable storage media. The storage media include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Details regarding computation of various types of measurement data (including rotation data and divergence data as performed by the rotation and divergence data computation module 406) are discussed further below.

The rotation data in the three spatial axes (k=x, y, z) is given by:

$$R_k = \frac{1}{2}\left[\frac{\partial v_i}{\partial j} - \frac{\partial v_j}{\partial i}\right], \quad \text{(Eq. 1)}$$

where $v_i$ represents the particle velocity along the i (i=x, y, z) axis, and $v_j$ represents particle velocity along the j (j=x, y, z) axis. In the foregoing nomenclature, the i axis is orthogonal with respect to the j axis, and both the i and j axes are orthogonal with respect to the k axis. The gradient $$\frac{\partial v_i}{\partial j}$$

represents a spatial derivative of $v_i$ with respect to the j axis, and the gradient $$\frac{\partial v_j}{\partial i}$$

represents a spatial derivative of $v_j$ with respect to the i axis. The particle velocity measurements can be made at or just under the ground surface 120 (FIG. 1A). At or just under the ground surface 120, the following relationships for deriving rotation data along the x and y axis may apply:

$$R_y = -\frac{\partial v_z}{\partial x} = +\frac{\partial v_x}{\partial z}, \quad \text{(Eq. 2)}$$

$$R_x = \frac{\partial v_z}{\partial y} = -\frac{\partial v_y}{\partial z}, \quad \text{(Eq. 3)}$$

where $v_x$ represents particle velocity along the x direction, $v_y$ represents particle velocity along the y direction, and $v_z$ represents particle velocity along the z direction. This implies that the rotation components about a horizontal axis, $R_y$ or $R_x$, can be derived by measuring just one of the terms in the right hand side of Eq. 2 or 3.

Although reference is made to deriving rotation data based on measured velocities in the foregoing examples, it is noted that other types of translational data, including displacement or acceleration data, can be used for obtaining rotation data in a manner similar to that described in connection with Eqs. 2 and 3 above.

A characteristic of providing the sensor device at the ground surface 120 (or free surface between the air and a solid or between the water and a solid) is that a spatial gradient and rotation become equivalent to one another, as expressed by Eq. 2 or 3.

By taking advantage of such characteristic when the sensor device is provided at the ground surface 120, measurements of the vertical gradient of horizontal translational data in a spike-shaped sensor device can be used to obtain the rotation data. A vertical gradient refers to a gradient taken with respect to the z axis. Horizontal translation data refers to translational data along the x or y axis. The vertical gradient of horizontal translational data can be expressed as $$\frac{\delta v_x}{\delta z} \text{ or } \frac{\delta v_y}{\delta z},$$

for example.

In the example arrangement of FIG. 2A or 2B, the foregoing vertical gradients of horizontal translational data can be obtained using measurements of closely spaced apart x sensors 204A and 204B, or closely spaced apart y sensors 206A and 206B.

The divergence of a wavefield, $\nabla \cdot V$, can be represented as:

$$\nabla \cdot V = \sum_{i=1}^{3} \frac{\partial v_i}{\partial i}. \quad \text{(Eq. 4)}$$

In Eq. 4, i=(x, y, z) represent the three orthogonal axes. At the free surface, Eq. 4 is expressed as:

$$\nabla \cdot V = \frac{2\mu}{\lambda + 2\mu}\left(\frac{\partial v_x}{\partial x} + \frac{\partial v_y}{\partial y}\right) = -\frac{2\mu}{\lambda}\left(\frac{\partial v_z}{\partial z}\right), \quad \text{(Eq. 5)}$$

Eq. 5 indicates that, at the free surface, the divergence of a wavefield, can be measured by just one partial derivative term $$\left(\frac{\partial v_z}{\partial z}\right).$$

In Eq. 5, the parameters $\mu$ and $\lambda$ are Lame parameters. The ratio of the Lame parameters $\mu$ and $\lambda$ is a function of the near-surface P- and S-wave velocities $\alpha$ and $\beta$:

$$\frac{\mu}{\lambda} = \frac{\beta^2}{\alpha^2 + \beta^2}. \quad \text{(Eq. 6)}$$

The partial derivative in the right-hand side of Eqs. 2, 3, and 5 can be measured by differentiating measurements from closely spaced apart particle motion sensors, such as closely spaced apart particle motion sensors. In some examples, the particle motion sensors are spaced apart along the longitudinal axis of a sensor device by a distance D (FIG. 1B) that is less than or equal to about 0.3 times a wavelength of a target signal for measurement by the sensor device. In further examples, the particle motion sensors are spaced apart along the longitudinal axis by a distance D that is less than or equal to about 0.1 times a wavelength of a target signal for measurement by the sensor device. Note that the foregoing distances D between the particle motion sensors are applicable to computing the rotation data according to Eqs. 2 and 3 and/or the divergence data according to Eq. 5.

Using the sensor device of FIG. 2A or 2B, the following data can be obtained: translational data (including $v_x$, $v_y$, $v_z$), rotation data (including $R_x$, $R_y$), and divergence data ($\nabla \cdot V$). With the sensor device of FIG. 2C, the same types of data can be obtained, except the divergence data. The foregoing data can be transmitted over a communication medium to a station.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A sensor device comprising:
   an elongated housing containing particle motion sensors spaced apart along a longitudinal axis of the elongated housing, wherein the elongated housing has a width; and
   a second portion comprising an outer housing having an inner chamber including communication circuitry to communicate over a communication medium, the second portion coupled to the elongated housing and having a width that is greater than the width of the elongated housing, wherein the second portion includes an impact surface that is above a top surface of the second portion, the impact surface to receive an impact force for deploying the sensor device into a ground surface, wherein the second portion further includes a connector structure to mechanically connect the impact surface to the elongated housing, wherein the connector structure extends internally through the inner chamber of the outer housing between the impact surface and the elongated housing.

2. The sensor device of claim 1, wherein the connector structure extends along a first central axis of the outer housing, a second central axis of the elongated housing, or a combination thereof.

3. The sensor device of claim 1, wherein the particle motion sensors in the elongated housing are spaced apart by a distance along the longitudinal axis, without providing particle motion sensors spaced apart in a direction perpendicular to the longitudinal axis.

4. The sensor device of claim 1, wherein the second portion is mechanically attached to the elongated housing.

5. The sensor device of claim 1, further comprising an impact button that provides the impact surface, the impact button protruding above the top surface of the second portion.

6. The sensor device of claim 5, wherein the impact button is attached to the elongated housing via the connector structure.

7. The sensor device of claim 6, wherein the elongated housing extends into the second portion.

8. The sensor device of claim 1, wherein the connector structure comprises a generally T-shaped connector structure.

9. The sensor device of claim 8, wherein the generally T-shaped connector structure has a segment that is in contact with the elongated housing.

10. The sensor device of claim 1, wherein the particle motion sensors are to measure translational data in a first direction, the particle motion sensors spaced apart along a second, different direction along the longitudinal axis; and
wherein the communication circuitry is to send the translational data to a system to compute rotation data about a third direction based at least in part on computing a gradient of the translational data with respect to the second direction.

11. The sensor device of claim 10, wherein the first direction is orthogonal to the second direction, and the first and second directions are both orthogonal to the third direction.

12. A method of forming a sensor device, comprising:
providing an elongated housing of the sensor device, the elongated housing containing particle motion sensors spaced apart along a longitudinal axis of the elongated housing, wherein the elongated housing has a width;
coupling a second portion of the sensor device to the elongated housing, the second portion comprising an outer housing having an inner chamber including communication circuitry to communicate over a communication medium, the second portion having a width that is greater than the width of the elongated housing; and
arranging an impact surface that is above a top surface of the second portion, the impact surface to receive an impact force for deploying the sensor device into a ground surface, wherein the second portion further includes a connector structure to mechanically connect the impact surface to the elongated housing, wherein the connector structure extends internally through the inner chamber of the outer housing between the impact surface and the elongated housing.

13. The method of claim 12, further comprising mechanically attaching the second portion to the elongated housing.

14. The method of claim 12, wherein the second portion has an outer housing with a top surface, the method further comprising providing an impact button that provides the impact surface, the impact button protruding above the top surface.

15. The method of claim 14, further comprising attaching the impact button to the elongated housing via the connector structure.

16. The method of claim 12, wherein the connector structure extends along a first central axis of the outer housing, a second central axis of the elongated housing, or a combination thereof.

17. The method of claim 12, wherein the connector structure comprises a generally T-shaped connector structure.

18. The method of claim 17, wherein the generally T-shaped connector structure has a segment that is in contact with the elongated housing.

19. A system comprising:
a plurality of sensor devices, wherein at least one of the sensor devices comprises:
an elongated housing containing particle motion sensors spaced apart along a longitudinal axis of the elongated housing, wherein the elongated housing has a width; and
a second portion comprising an outer housing having an inner chamber including communication circuitry to communicate over a communication medium, the second portion coupled to the elongated housing and having a width that is greater than the width of the elongated housing, wherein the second portion includes an impact surface that is above a top surface of the second portion, the impact surface to receive an impact force for deploying the sensor device into a ground surface, wherein the second portion further includes a connector structure to mechanically connect the impact surface to the elongated housing wherein the connector structure extends internally through the inner chamber of the outer housing between the impact surface and the elongated housing.

20. The system of claim 19, wherein the at least one sensor device further comprises an impact button that provides the impact surface, the impact button protruding above the top surface of the second portion.

* * * * *